BALANCED DEMODULATOR FOR FREQUENCY-SHIFT DATA SIGNALS

Filed Dec. 19, 1961 4 Sheets-Sheet 1

INVENTOR
C. W. FARROW
BY
Charles Scott Phelan
ATTORNEY

INVENTOR
C. W. FARROW
BY
Charles Scott Phelan
ATTORNEY

BALANCED DEMODULATOR FOR FREQUENCY-SHIFT DATA SIGNALS
Filed Dec. 19, 1961 
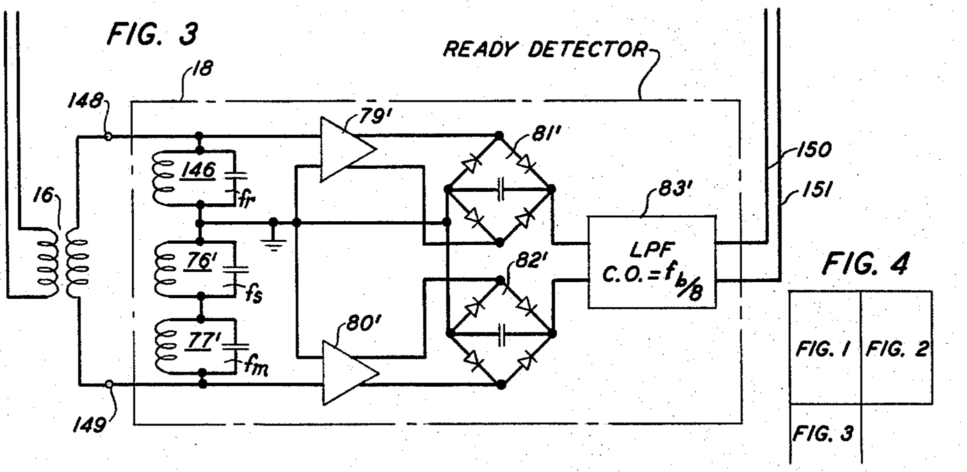
FIG. 3, FIG. 4
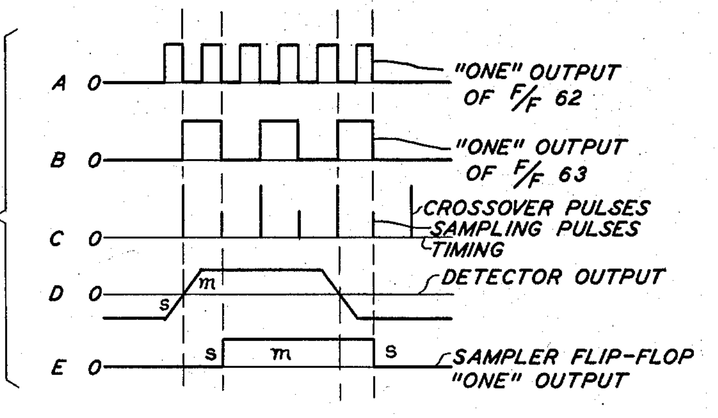
FIG. 8 (IDEAL M=S)
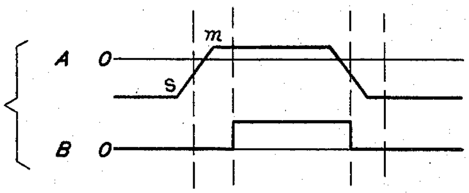
FIG. 9 (M<S)
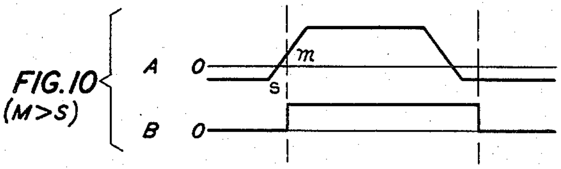
FIG. 10 (M>S)
INVENTOR
C. W. FARROW
BY
Charles Scott Phelan
ATTORNEY April 20, 1965 C. W. FARROW 3,179,748

BALANCED DEMODULATOR FOR FREQUENCY-SHIFT DATA SIGNALS

Filed Dec. 19, 1961 4 Sheets-Sheet 4

INVENTOR
C. W. FARROW
BY
[signature]
ATTORNEY

United States Patent Office 3,179,748

Patented Apr. 20, 1965

3,179,748
BALANCED DEMODULATOR FOR FREQUENCY-SHIFT DATA SIGNALS

Cecil W. Farrow, Monmouth Hills, N.J., assignor to Bell Telephone Laboratories, Incorporated, New York, N.Y., a corporation of New York Filed Dec. 19, 1961, Ser. No. 160,555
20 Claims. (Cl. 178—88)

Figure 1:
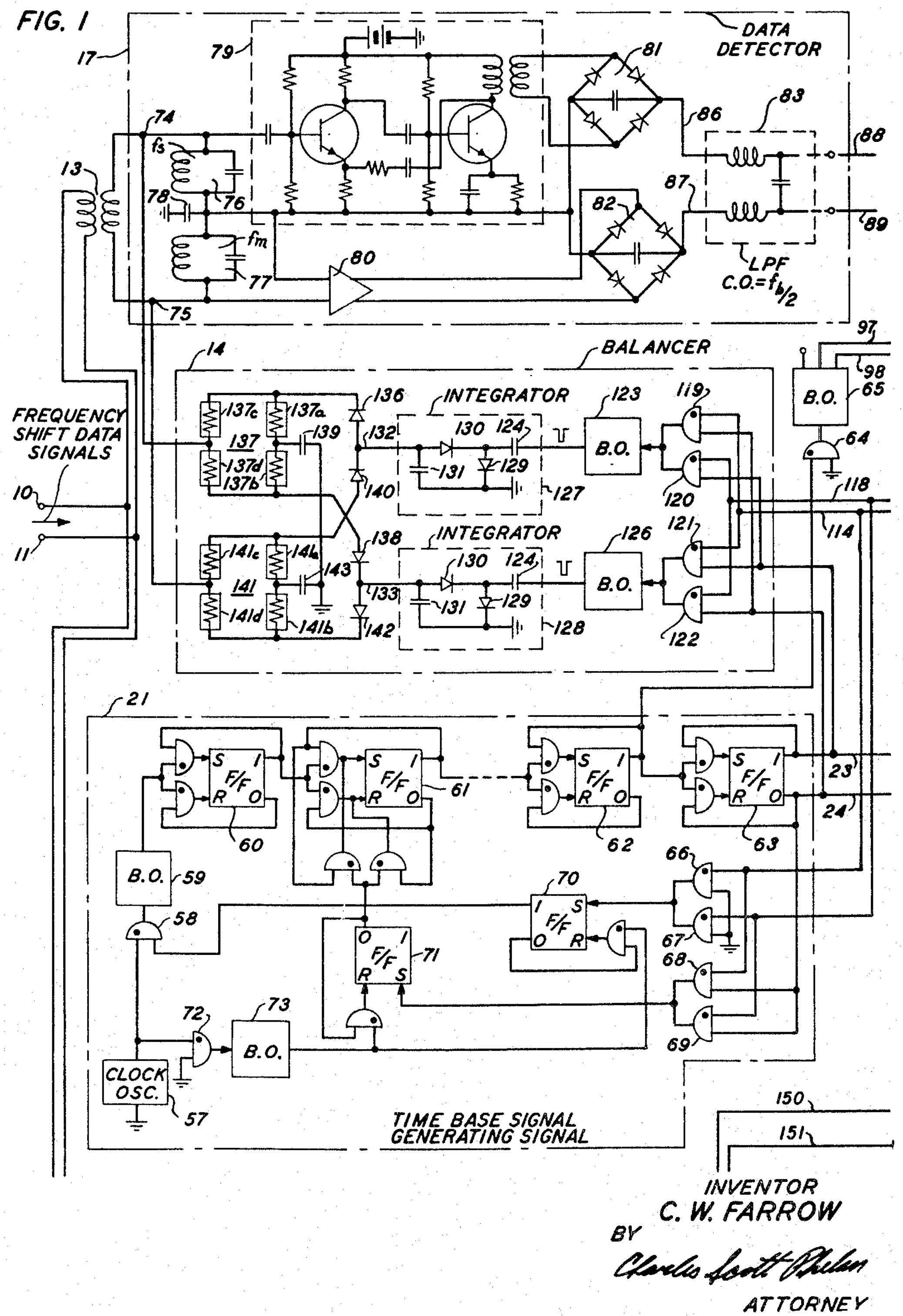

This invention relates to a demodulator for frequency-shift data systems. The invention relates particularly to analog demodulators for such data systems which may be at times subject to a high noise level.

An analog demodulator is hereafter considered to be a circuit which accomplishes a translation from one signal form to a second form in an essentially continuous manner as a function of some predetermined characteristic of the one signal form. By contrast, a digital demodulator may be one in which the circuit looks at discrete samples of the one form of signal in successive steps and utilizes the samples in some manner to construct the data information in the second signal form.

Frequency-shift demodulators which operate in the analog mode are well known, and all have heretofore been subject to a number of common problems. For example, it is desirable in frequency-shift systems to have a relatively small frequency difference between the nominal mark and space frequencies. Thus, frequency-sensitive detectors tend to produce outputs which have only a small amplitude difference between mark and space bits. A detector may have rather sharp discriminating characteristics so that it is responsive to the nominal system frequencies, plus or minus anticipated frequency differences among the various stations with which it may work; but the detector output is still usually rather small in terms of typical noise and distortions that may be present. The effects of noise, distortion, and small signal amplitudes become significant at the slicing circuit normally employed in the prior art to distinguish between mark and space signal bits.

One type of distortion that may appear during transmission of a signal is the attenuation of the frequency components of a signal to different degrees. This is true of frequency-shift signals even though the frequencies of principal interest are quite close together. Equalization is, of course, employed in transmission systems to reduce the effects of such differential attenuation but a number of factors can cause such equalization to be somewhat less than perfect. Resulting unequalized distortion in the amplitude of received signals has important effects upon the demodulation of the signals.

One important effect is that a small amount of distortion can change the relative amplitudes of mark and space signal excursions with respect to the critical slicing amplitude of prior art circuits so that one bit type may be more subject to noise interference than the other. A large amount of distortion can shift detected signal excursions so greatly that the transition between mark and space amplitudes does not pass through the critical slicing amplitude at all. Distortions, whether large or small, tend to increase the probability of errors in signal reception.

Distortion may take the form of amplitude bias or time bias as between mark and space data bits. Various signal bias detecting schemes are known in the art, but all of these generally activate an alarm for alerting an attendant. This attendant then causes appropriate system adjustments to be made to correct the bias situation. In the meantime, however, the system must be shut down or the higher error probability must be tolerated. Important data losses may result in either case.

Inherent in the problem of detecting and correcting distortion conditions is the broad problem of discriminating between detected mark and space signals at any time, whether or not distortion is present. Conventional logic circuits are generally insensitive to the low levels of signals produced by analog frequency detectors in frequency-shift data systems so the prior art usually employs direct current amplifiers to build up detected signals to usable levels. However, such amplifiers bring with them numerous problems that are well known in the art.

A further typical problem often associated with frequency-shift data transmission systems is the problem of detecting the presence of the start signal which usually precedes a message to activate receiving circuits. Such a start signal often comprises a combination of data bit intervals of different frequencies and typically may include a certain combination of mark and space frequency intervals, together with a predetermined number of intervals of a ready frequency, i.e., a frequency that lies in the spectrum midway between the mark and space frequencies. Accordingly, the aforementioned difficulties of discriminating between mark and space signals are compounded when it is attempted to distinguish the ready frequency from either of the other two frequencies. Furthermore, it is necessary to distinguish the ready frequency in a ready-start code from ready frequencies which may appear incidentally in received signals in each transition between the mark and space frequencies.

It is therefore one object of the invention to alleviate the burden of the aforementioned problems in frequency-shift demodulators of the analog variety.

Another object is to increase the reliability of analog demodulators in frequency-shift systems.

A further object is to improve information detection means for frequency-shift systems.

Still another object is to reduce the probability of error in demodulated signals due to distortion that may be present in line signals applied to a frequency-shift demodulator.

Yet another object is to improve discriminating techniques for utilizing detected data signals.

These and other objects of the invention are realized in an illustrative embodiment thereof wherein signal compensation is provided in a balanced demodulator to offset certain transmission line effects which tend to influence demodulator accuracy. Improved circuits are also provided in combination with the compensating means for discriminating among different types of received data information bits.

One feature of the invention is that demodulator output signal distortion is detected; and compensating signals are automatically applied to the demodulator input thereby assuring substantially continuous demodulator operation with minimum error probability in the presence of input signal distortion.

It is another feature of the invention that a balanced signal sampling circuit is employed for discriminating between detected mark and space bits and synchronizing low level detected data signal excursions with locally generated time base pulses.

A further feature of the invention resides in a structure for filtering frequency-shift signals to pass primarily a frequency component which is well below the data bit rate of received signals. This filtering structure is combined with shift register circuits in such a way that a predetermined ready-start combination of mark and space signals with ready signals may be reliably detected to initiate the generation of a start pulse.

Figure 2:
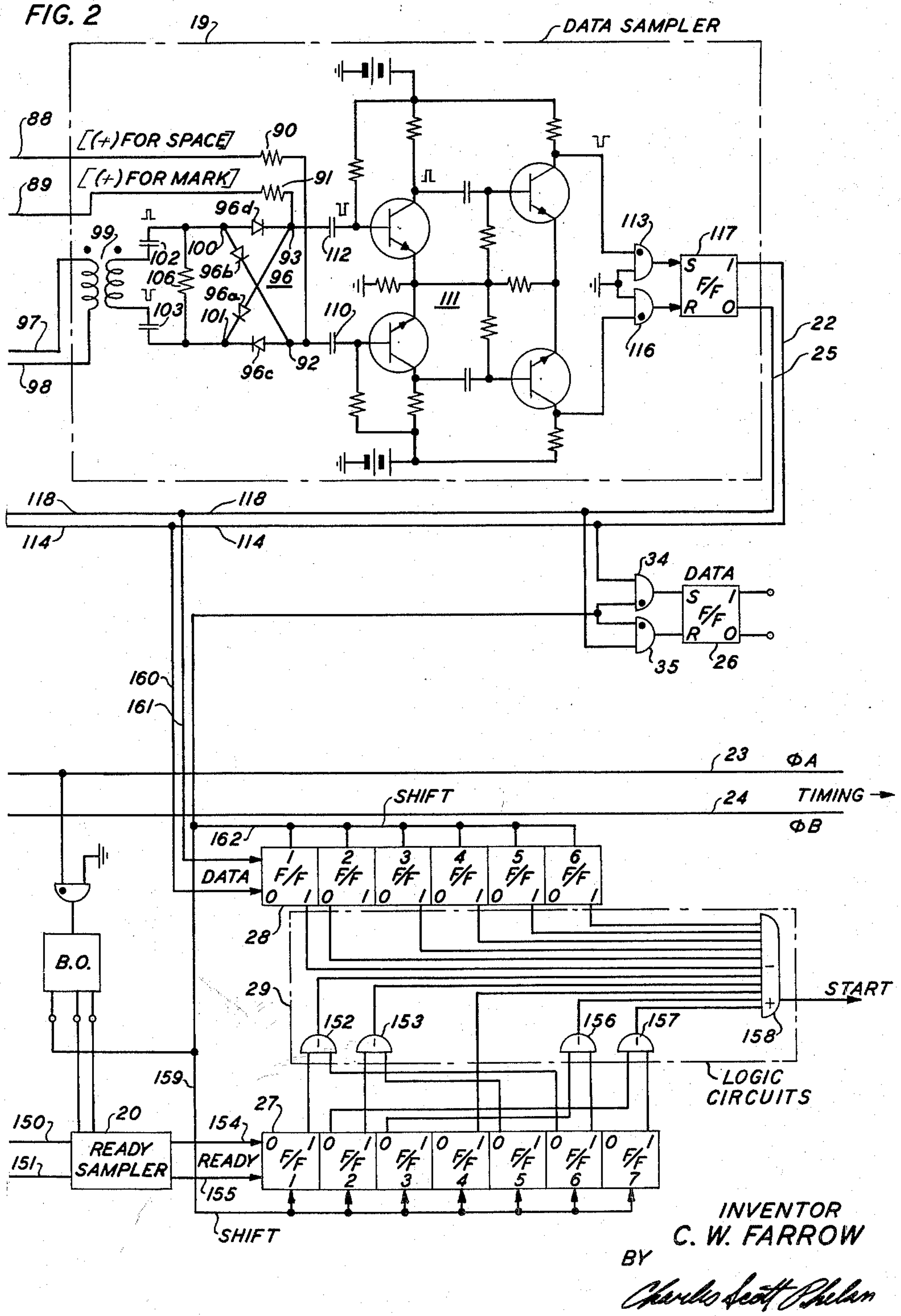
Figure 6A:
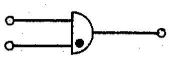

A perusal of the following description, including the appended claims, in connection with the attached drawing should result in a comprehension of the aforementioned, and other, features and advantages of the invention as well as the underlying inventive principles thereof. In the drawing:

FIGS. 1, 2 and 3 together comprise a diagram, partly in schematic form and partly in block and line form, of the aforementioned illustrative embodiment of the invention;

FIG. 4 shows how FIGS. 1 through 3 should be combined;

FIGS. 5A–5D, 6A–6D and 7 show some of the basic circuit blocks used in FIGS. 1 through 3; and FIGS. 8 through 10 include wave diagrams illustrating the operation of one aspect of the invention.

*General Description*

FIGS. 1, 2, and 3 may be combined as illustrated in FIG. 4 to comprise a diagram of a frequency-shift demodulator in accordance with the invention. The broad relationships among the circuits of these figures will be described before presenting details of their operation.

Frequency-shift input signals appear at terminals 10 and 11 in FIG. 1 from any suitable transmission line or data processing equipment. These signals may include typically successive data bit intervals of equal duration and having in each interval a burst of oscillations at a particular frequency which is individual to a certain type of data bit. Thus, mark and space bits would be represented by bit intervals with oscillation bursts of different frequencies which are usually separated by a frequency that is equal to the data bit rate. The mark and space frequencies need not be harmonically related. Ready bits may be represented by bit intervals with oscillation bursts at a frequency which is midway between the mark and space frequencies. Each data bit interval in one operative demodulator was arranged to be of a suitable length so that about three and one-half half-cycles of the lowest one of the data frequencies were presented in any interval, but indications are that the bit interval could include as little as one-half of a cycle. Each data message is usually preceded by a ready-start code combination which includes a predetermined permutation of ready, mark, and space bit intervals. The combination is utilized to signal the beginning of a message and thereby initiate operation of equipment which is to utilize the demodulated data.

Transformers 13 and 16 are utilized as coupling devices between the demodulator and the terminals 10 and 11 so that the demodulator equipment, which will subsequently be described, may have a predetermined fixed design and yet be readily connectable to transmission systems which are either balanced or unbalanced with respect to ground.

A balanced data detector 17 receives the data signals and is adapted to be responsive to mark and space frequencies for producing on its output leads a data signal wave with signal excursions of opposite polarity for mark and space bit intervals, respectively. A ready detector 18 in FIG. 3 is similar to the data detector 17 and receives data signals from the secondary winding of transformer 16. In detector 18 the circuits are designed to be primarily responsive to bit intervals which include the ready frequency and to produce on the detector output leads a signal wave having excursions of opposite polarity for ready and for other bit intervals, respectively. In FIG. 2 data sampler 19 and a ready sampler 20 receive the signal output waves from the data and ready detectors, respectively. These samplers also receive time base signals from a time base signal generating circuit 21 in FIG. 1 for synchronizing their operation to produce output signal transitions in synchronism with the local time base signals. An output lead 22 from data sampler 19 is provided for coupling the synchronized data signals to any suitable utilization device. In a similar manner two leads 23 and 24 are provided for coupling time base signals from the circuit 21 to the utilization equipment. A balancer 14 is responsive to the outputs of data sampler 19 and time base circuit 21 for detecting mark-space bias and applying bias-compensating signals to the input of detector 17.

A ready signal shift register 27 receives the output of ready sampler 20 and stores certain parts of that output in a manner which will be described. Similarly, the output of data sampler 19 is applied to a shift register 28 wherein it is also temporarily stored. Registers 27 and 28 are of the type illustrated in FIG. 7. Logic circuits 29 have their input connections coupled to the various stages of shift registers 27 and 28 for detecting the presence in these shift registers of the ready, mark, and space bits which indicate that a ready-start code permutation has occurred. At that time a one-bit start pulse is produced by the logic circuits 29 and coupled to utilization circuits (not shown) to initiate their operation.

Figure 6B:
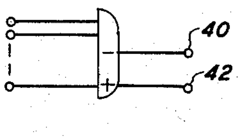
Figure 6C:
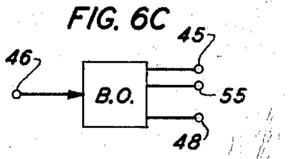
Figure 6D:
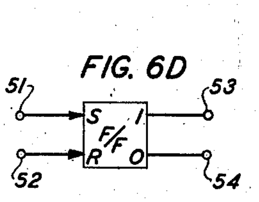
Figure 7:
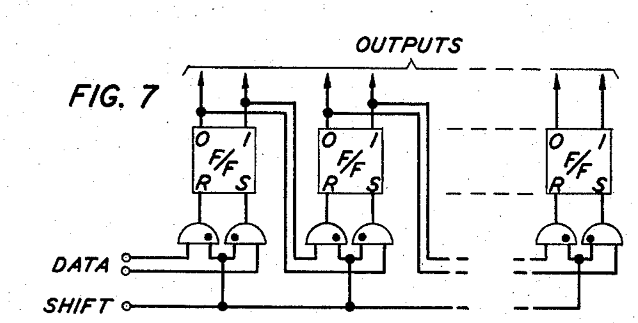

Before beginning a discussion of the details of the demodulator in FIGS. 1 through 3, the reader's attention is directed to FIGS. 5 through 7 wherein are shown schematic diagrams for certain of the logic block circuits that are used in the circuits of FIGS. 1 through 3. Thus, FIG. 5A shows an enabling, or AND, gate which includes a resistor 30 and a capacitor 31 connected in series between two input terminals 32 and 33. The midpoint in the series connection between resistor 30 and capacitor 31 is connected by a diode 36 to an output terminal 37. Diode 36 is poled for conduction of forward current away from terminal 37. The application of an enabling voltage to terminal 32 conditions the gate, after a time determined by the value of resistor 30 and capacitor 31, to be opened when a negative-going pulse of relatively short duration is thereafter applied to terminal 33. Input to terminal 33 in FIG. 5A is shown as following the trailing edge of an enabling pulse to terminal 32 to indicate that a finite time is required to disable the gate after the enabling signal is removed. When the enabling signal and the mentioned negative-going pulse coincide, there appears at output terminal 37 a negative-going pulse of current. For convenience in future discussions involving coincidence gates of the type shown in FIG. 5A it may be assumed that input terminal 32 is at some suitable positive potential, such as 16 volts, in the absence of an enabling voltage and that the applied enabling voltages are of a suitable amplitude to clamp the terminal 32 to a potential which is substantially at ground. Similarly, output terminal 37 is considered to be at a slightly positive potential in the absence of the coincidence condition and to apply a negative current pulse for the duration of the input pulse at terminal 33. FIG. 6A illustrates the schematic representation which is employed for the gate circuit shown in FIG. 5A.

Figure 5A:
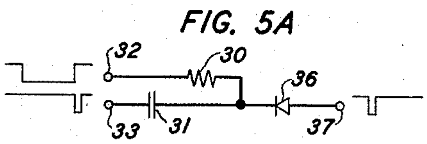
Figure 5B:
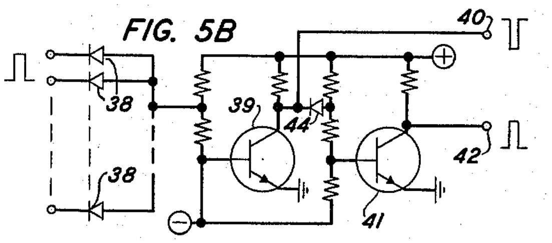

FIG. 5B illustrates a transistor-diode AND gate in which the application of positive signals to all of its input terminals biases the AND-connected diodes 38 nonconducting. When diodes 38 are off a common-emitter-connected transistor 39 conducts and produces a ground voltage at the output terminal 40 which is coupled to the collector electrode of transistor 39. Conduction in transistor 39 also causes nonconducting biases to be applied to the base electrode of another common-emitter-connected transistor 41 through a diode 44 to produce a positive voltage at the output terminal 42 which is connected to the collector electrode of transistor 41. Thus, when the gate of FIG. 5B is enabled by the application of positive signals to all of its input terminals, an inverted, or ground, voltage appears at output terminal 40; and an in-phase positive voltage appears at output terminal 42. The corresponding schematic representation for the gate of FIG. 5B is shown in FIG. 6B and includes a negative sign adjacent to the inverted output lead and a positive sign adjacent the in-phase output lead.

Figure 5C:
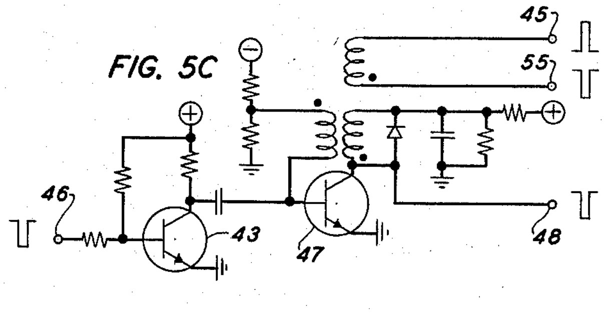

FIG. 5C shows a blocking oscillator circuit that has been found to be convenient for operation in connection with other logic circuits. This oscillator includes a common-emitter-connected transistor 43 which inverts negative pulses applied to input terminal 46 and couples them to the base electrode of a transistor 47 that is the active element of the blocking oscillator per se. The collector electrode of transistor 47 is connected to an output terminal 48, and a negative pulse appears at this terminal for the duration of the operation of the blocking oscillator. Output terminals 45 and 55 are inductively coupled to the oscillator feedback transformer to produce a balanced version of the pulse at terminal 48. FIG. 6C shows the schematic representation of the blocking oscillator circuit of FIG. 5C. In FIG. 6C the balanced output terminals 45 and 55 are set apart from unbalanced terminal 48.

Figure 5D:
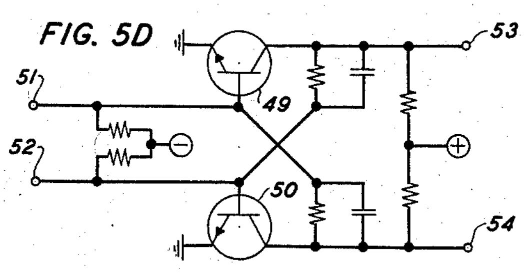

A flip-flop circuit is illustrated in FIG. 5D and includes two transistors 49 and 50 connected in a conventional bistable multivibrator circuit. The emitter electrodes of both transistors are connected to ground, and the collector electrodes are separately connected to a source of positive potential. Base electrodes of the transistors are likewise separately connected to the negative terminal of the source. Resistance-capacitance cross-coupling circuits are provided between the collector electrode of each transistor and the base electrode of the other. Input signals are applied at terminals 51 and 52, which are also connected to the transistor base electrodes, for initiating the transfer of conduction in the flip-flop circuit from one of the stable conduction conditions to the other. Output signals for the multivibrator appear at terminals 53 and 54. Thus, if transistor 49 is conducting and transistor 50 is nonconducting the application of a negative-going current pulse to input terminal 51 biases transistor 49 nonconducting and causes a positive potential to appear at output terminal 53. At the same time transistor 50 is biased for conduction and produces at terminal 54 a ground signal. The reverse operation takes place when a current pulse is applied at input terminal 52. The schematic representation of the flip-flop of FIG. 5D is shown in FIG. 6D with the input terminals 51 and 52 designated "S" for set and "R" for reset, respectively, while the output terminals 53 and 54 are designated "1" and "0" respectively.

FIG. 7 illustrates the manner in which a number of flip-flop circuits may be combined with diode AND gates to form a shift register in a well known manner. The AND gates are utilized for coupling signals to the set and reset inputs of the flip-flop. Data signals are applied to the enabling inputs of the gates either directly from a data source or from the "1" and "0" output leads of the preceding shift register stage. Shift pulses are applied to the actuating input terminals of all of the gates simultaneously to shift information through the register.

*Time base phase control*

A consideration of the details of the demodulator may being conveniently by looking at the time base signal generating circuit 21 in FIG. 1. A clock signal oscillator 57 should advantageously be a highly stable oscillator operating at a frequency which is considerably higher than the bit rate of the data system in which the demodulator is to be used. Output pulses from the oscillator are applied through an AND gate 58 to drive a blocking oscillator 59 for actuating the flip-flop circuits 60, 61, 62, and 63 which are connected together in a binary counting arrangement for dividing down the frequency of oscillator 57. Enough stages are employed to accomplish the desired frequency division of the oscillator frequency down to the data bit rate.

Each of the binary counter flip-flop circuits has signals coupled to its set and reset inputs through diode AND gates. The ONE and ZERO outputs of each flip-flop are coupled back to the enabling input connections of the AND gates in its set and reset input circuits, respectively. The actuating input connections of the set and reset gates for each flip-flop circuit are connected together; and, in the case of flip-flop 60, these activating inputs are driven by blocking oscillator 59 so that the flip-flop circuit operates in a complementing mode wherein each input pulse from oscillator 59 causes the flip-flop circuit to transfer from its then prevailing stable condition to its other stable condition. Similarly, the ONE output of each flip-flop is connected to the actuating inputs of the gates in the succeeding flip-flop stage in the binary counter.

Voltage transitions at each output of flip-flop circuit 62 occur at twice the data bit rate of the system while transitions at the outputs of flip-flop 63 occur at the bit rate. The ONE outputs of both flip-flop circuits are shown in FIGS. 8A and B. If the output of flip-flop 62 is in phase with the data signals, a first negative-going voltage transition from flip-flop 62 occurs midway between the beginning and end of a data bit interval. This transition, which is herein referred to as a time base sampling transition, is the negative-going transition at the ONE output of flip-flop 62 as the flip-flop resets. The succeeding negative-going transition from the flip-flop 62 occurs at the instant corresponding to the end of one bit interval and the beginning of the next one, and this transition is herein referred to as a time base crossover transition. The sampling and crossover transitions actuate a permanently enabled AND gate 64 to drive a blocking oscillator 65. Corresponding output pulses from oscillator 65 are the sampling and crossover pulses, respectively, illustrated in FIG. 8C. Other timing signals from time base circuit 21 may also be coupled through gates and blocking oscillators similar to gate 64 and oscillator 65 when it is desired to produce a pulse in response to a time base signal transition.

Although oscillator 57 in FIG. 1 is stable, the phase of the outputs from the binary counter stages may be readily adjusted in a manner which will now be described. This phase control is based upon a comparison of time base signals from generator 21 with data signal transitions from the output of data sampler 19. Four diode AND gates 66, 67, 68, and 69 are utilized to perform the necessary comparison. Gates 66 and 67 are permanently enabled by the connection of their enabling inputs to ground. The actuating inputs of gates 66 and 67 are connected to the two output leads of data sampler 19 so that each data transition between mark and space bits in the output of sampler 19 opens one of the gates 66 or 67. Gates 68 and 69 have their enabling inputs connected together to the ZERO output of binary counter flip-flop 63 so that these gates are enabled at the bit rate during one-half of each bit interval. When circuit 21 is properly phased, gates 68 and 69 are enabled in the portion of each interval following a sampling pulse and preceding a crossover pulse. The output connections of gates 66 and 67 are combined and coupled to the set input of a flip-flop 70 so that this flip-flop is set in response to each data transition and produces a positive ONE output that is applied to the enabling input of gate 58 for blocking that gate. This action inhibits the application of further oscillator pulses to blocking oscillator 59 until flip-flop 70 may be reset.

Output connections from gates 68 and 69 are likewise combined and applied to the set input of a flip-flop 71 for setting that flip-flop any time that a data transition occurs after a data sampling pulse has occurred. The resulting negative-going output of flip-flop 71 is applied to actuating input of a pair of complementing gates for counter flip-flop stage 61 to advance the operation of the counter. It will be understood, of course, that normal circuit delays cause the flip-flop 71 to be triggered at an instant between output pulses from oscillator 57 so that flip-flop 61 never receives triggering instructions simultaneously from flip-flops 60 and 71.

The first pulse from oscillator 57 after a data transition has occurred actuates a permanently enabled AND gate 72 for driving a blocking oscillator 73 to generate a reset pulse for the flip-flops 70 and 71. This action also enables gate 58 so that the phase control circuits are now ready to examine the phase relationship of the next data transition with respect to the time base signals.

It may be seen from the foregoing description that if a data transition follows a time base sampling pulse (it then leads a time base crossover pulse) one of the gates 68 or 69 is opened and flip-flop 71 is set to cause the phase of the binary counter to be advanced thereby tending to bring the binary counter crossover pulses into a condition which approaches coincidence with data transitions. Similarly, if a data transition leads a time base sampling pulse (it then lags the time base crossover pulses) AND gates 68 and 69 remain closed. One of the gates 66 or 67 is opened, as previously described; and the application of one clock pulse to the binary counter is inhibited without the application of an advance pulse to the second counter flip-flop 61. Thus, the phase of the binary counter and the time base signals is inhibited somewhat so that the time base signals are retarded to approach coincidence between the time base crossover pulses and the data transitions. At each data transition in the output of sampler 19 the phase control circuits compare the phase relationship between the data transition and the time base signals and initiate a change in the time base phase which tends to bring the time base crossover pulses into phase coincidence with the data transitions.

*Data detector*

Frequency-shift signals from the secondary winding of transformer 13 in FIG. 1 are received by data detector 17 and steered into two different signal conduction paths by means of bandpass filtering circuits. A first parallel resonant circuit 76 is connected in series with a second parallel resonant circuit 77 between the detector input terminals 74 and 75. The midpoint in this series circuit is connected to ground through a capacitor 78. Circuit 76 is designed to be resonant at the nominal space frequency $f_s$ of the frequency-shift signals while the circuit 77 resonates at the mark frequency $f_m$.

One of the signal paths of data detector 17 has its input connected across the resonant circuit 76 and includes an amplifier 79 having two common emitter transistor amplifier stages therein. Amplifier 79 also has transformer coupling for reproducing signals at its output terminals. The other signal path includes another amplifier 80 which is similar to the amplifier 79, connected across the resonant circuit 77. These amplifiers are included at this point in the circuit in order to boost the signal level prior to rectification in order to avoid the need for subsequent direct-current amplification with its well known problems of adjustment and drift. However, the gain of the amplifiers must be restricted so that increases in line signal amplitude will not cause the amplifiers to limit. Amplifiers 79 and 80 also have sufficient input resistance to give resonant circuits 76 and 77 some tolerance to possible shifts in line frequencies from nominal design values.

Each of two full wave rectifying bridges 81 and 82 receives at one of its pairs of diagonally opposite terminals the transformer output signals from one of the amplifiers 79 and 80. A capacitor is connected between the other pair of diagonally opposite terminals of each bridge, and the same terminal pair is also connected between ground and a different one of the input terminals of a balanced low-pass filter 83. Output leads 86 and 87 from bridges 81 and 82 include the full wave rectified data signals from the line. One of the leads is more positive than the other for mark and space signals, respectively. Filter 83 is designed with an upper cutoff frequency which is approximately equal to one-half of the bit rate of the data system so that it produces on its output leads 88 and 89 the envelope of the rectified signals on leads 86 and 87. This envelope, of course, comprises signal excursions of different polarities with respect to ground for the mark and space bits, respectively.

*Data sampler*

In FIG. 2, positive and negative signals which are applied to data sampler 19 by leads 88 and 89 from filter 83 may have a rather small magnitude because of the aforementioned restriction on the gain of amplifiers 79 and 80 in the data detector 17. In fact, such signal excursions can be so small that ordinary logical circuits of the type described in connection with FIGS. 5 through 7 are completely insensitive to the range of voltages involved. This is a familiar problem in the field of analog demodulators and is usually handled by inserting direct-current amplification. However, in accordance with one aspect of the present invention, a balanced data sampler is provided which has been found to be fully capable of discriminating between mark and space signal excursions at the low amplitude levels found at this point in the demodulator. Thus, the signals on leads 88 and 89 are applied through resistors 90 and 91, respectively, to the terminals 92 and 93 of one diagonal of a diode bridge 96.

Time base signals at twice the bit rate are applied to sampler 19 from the output of counter flip-flop 62 in time base generating circuit 21 through gate 64 and blocking oscillator 65. The balanced output of blocking oscillator 65 is utilized in sampler 19; and, in fact, a transformer 99 in sampler 19 has two windings which may be two of the windings of the transformer of the blocking oscillator 65. Thus, each blocking oscillator output pulse corresponds to a negative-going transition at the ONE output of flip-flop 62 and also drives terminal 100 positively with respect to terminal 101. Time base signals are coupled by transformer 99 to the terminals 100 and 101 of the other diagonal of bridge 96. Two capacitors 102 and 103 are connected in series between the secondary winding terminals of transformer 99 and the bridge terminals 100 and 101 for direct current blocking purposes.

It will be observed in FIG. 2 that all of the diodes in bridge 96 are poled for the forward conduction of electric current away from terminal 100 and toward terminal 101. During the course of operation, capacitors 102 and 103 become charged so that they tend to bias all diodes in bridge 96 nonconducting. The magnitude of bias provided by capacitors 102 and 103 is not so large that a time base pulse coupled to the bridge 96 from transformer 99 would be completely cut off. However, such bias is enough to prevent the diodes from conducting between time base pulses due to the signals on leads 88 and 89. Resistor 106 bleeds off the bias voltage preventing the diodes from cutting off the time base pulses. If a time base pulse appears in coincidence with a data signal, the two cooperate to apply a greater conducting bias to two bridge diodes.

For example, assume that a mark bit is being received. At this time lead 89 is more positive than lead 88, and the data signals tend to bias bridge diodes *96a* and *96b* for conduction. The next time that flip-flop 62 in time base generating circuit 21 changes from its set to its reset condition, the time base signal coupled to bridge 96 by transformer 99 tends to make bridge terminal 100 more positive than bridge terminal 101. This action reinforces the conducting bias tendency for diodes *96a* and *96b* and drives them into conduction. When diode *96a* conducts, a negative pulse is coupled through a capacitor 112 to one of the input connections of a balanced amplifier 111. Similarly, if a space were being received lead 88 would be more positive than lead 89 thereby tending to bias bridge diodes *96c* and *96d* into conduction so that the next time base pulse of appropriate polarity couples a negative pulse to coupling capacitor 110 and the other input of the balanced amplifier 111.

Amplifier 111 includes a pair of two-stage common emitter amplifiers in a balanced connection. The input stages are biased to be normally conducting and the output stages normally nonconducting so that a negative input pulse at one amplifier input terminal is reproduced in amplified form at the corresponding output. The output collector electrodes of the balanced circuit are connected to the actuating inputs of two AND gates 113 and 116 which have their enabling inputs permanently grounded. These gates control the stability condition of a flip-flop 117. A mark bit following a space bit causes flip-flop 117 to be set and produce a plus ONE output on leads 22 and 114. A space bit following a mark bit causes flip-flop 117 to be reset and produce a plus ZERO output on leads 118 and 25. Positive-going and negative-going signal excursions on leads 22 and 25 are coupled to AND gates 34 and 35 in the set and reset inputs of a data flip-flop 26. Each negative-going data excursion enables one of the gates 34 or 35 to pass a time base pulse, in response to a time base signal transition from the phase A lead 23, for triggering flip-flop 26. Since sampler 19 receives time base pulses at twice the data bit rate, some data bits in the output of flip-flop 117 may under certain conditions last for an odd multiple of one-half of a bit interval. Flip-flop 26 corrects this situation before the demodulated data is utilized because the flip-flop can be operated at the bit rate only.

Positive-going and negative-going signal excursions on leads 114 and 118 are applied to the signal balancing circuit 14 in FIG. 1.

Balanced samplers, such as sampler 19, have an additional advantage beyond their ability to discriminate between small signal amplitudes. They eliminate the need for the separate limiter stage, or automatic gain control amplifier, generally used in frequency-shift demodulators.

Ordinarily a limiter would be used to prevent entry into the demodulator of spurious amplitude modulation that may be present in the received line signal and which could pull the detected signal variations completely above or below the critical discriminating level of prior art slicers thereby defeating the slicer function. The use of a balanced sampler, however, requires that the detected data be polarized in one direction for mark and in the opposite direction for space regardless of changes in amplitudes. Balanced detector 17 produces such an output. Balanced sampler 19 is responsive to changes in signal polarity, not simply changes in signal amplitude; and its function is not defeated by spurious amplitude modulation of the line signal.

*Signal balancer*

As discussed at the outset, frequency-shift data systems are subject to unwanted variations in the transmission of various frequency components for one reason or another. These variations are carried through frequency-sensitive detecting devices and appear as a bias favoring either marks or spaces even though the balanced nature of the circuit prevents the variations from completely defeating the circuit function. However, distortion in the detected output signals results in a tendency toward a greater error probability. These difficulties may be experienced by the frequency-sensitive detectors 17 and 18 shown in FIGS. 1 and 3 since each of the detectors employs resonant circuits tuned to certain data frequencies for steering the different data bit types into different signal conduction paths.

With specific reference to the data detector 17, a reduction in the amplitude of the mark frequency with respect to the space frequency amplitude would tend to favor spaces and cause a single mark, or the first mark of a transition from mark to space, to be shortened. It would, therefore, be more difficult to detect the presence of mark signals and to distinguish those signals from the space signals with the further result that the data becomes more subject to errors due to noise. Furthermore, it is well known that low-pass filter circuits such as circuits of the filter 83 attenuate the high frequency components needed to produce steep sided output pulses so a substantial time is required to reproduce on output leads 88 and 89 envelope voltage variations appearing at the leads 86 and 87. These two factors, i.e., changes in signal amplitude when the applied frequency changes and the characteristic sloping voltage transitions of the low-pass filter output, cooperate to prevent the data sampler 19 from indicating a data transition at precisely the time when a transition actually takes place at the input terminals 10 and 11. This difficulty will be further discussed in detail in connection with FIGS. 8 through 10.

FIGS. 8A and B show output waves of flip-flops 62 and 63 in relation to the time base pulses of FIG. 8C to facilitate an understanding of the operation of balancer 14.

FIG. 8C shows time base pulses appearing at terminal 100 in sampler 19 as a result of each set to reset transition of counter flip-flop 62. Actually the pulses would be of essentially constant amplitude, but in FIG. 8C crossover pulses have been shown as being taller than sampling pulses to make it easier to follow the description of circuit operation. It will be observed that data transitions in the sampler output wave occur at the sampling pulse times in the ideal situation of FIG. 8 because at crossover pulse times there is insufficient detected data signal to unbalance signals in balanced sampler 19 so that flip-flop 117 can be triggered.

FIG. 8D shows an idealized output wave portion from detector 17 for a space-to-mark transition followed after two data bit intervals by a mark-to-space transition. Mark and space portions have essentially equal amplitude excursions from the indicated zero voltage, ground, level. The sloping transitions between mark and space excursions result from the aforementioned characteristics of filter 83.

FIG. 8E shows the corresponding output wave which would appear at the output lead 118 of sampler 19 for the idealized condition in FIG. 8D.

FIGS. 9A and B illustrate the changes that would take place in the detector and sampler outputs if the mark signal amplitude at the input to amplifier 80 were less than space signal amplitude at the input to amplifier 79. The space signal excursions in the detector output are then much larger than the mark excursion. This is mark-space bias of the amplitude type, i.e. one of the bits tends to be consistently larger than the other. Time bias is also present because the mark bit is now of shorter duration than the space bit. The time bias carries over to the sampler output as can be seen in FIG. 9B.

FIGS. 10A and 10B show similar changes that would result from the ideal conditions of FIG. 8 if the space signal amplitude were less than mark amplitude at the inputs to amplifiers 79 and 80. In this case the mark is taller and persists longer than the space, and the time bias once more carries over to the sampler output.

In order to avoid the distorted data waves illustrated in FIGS. 9 and 10, a compensating circuit is provided to detect mark-space bias and generate a compensating signal. In the illustrative embodiment, the occurrence times of data transitions in the output of data sampler 19 are compared in balancer 14 with time base signals from circuit 21. Time bias thus detected is indicative of the amount of change in the phase of data transitions and is utilized to generate a compensating signal in the event that a departure from the ideal condition is detected.

It will be recalled from the earlier discussion of time base generating circuit 21 that the output pulses from blocking oscillator 65 occur at twice the data bit rate and that the time base is adapted so that alternate ones of the pulses from the oscillator should occur at data crossover times, i.e., at times between data bit intervals when detected data signal transition should occur. The remaining time base pulses are initiated midway between the time base crossover pulses and correspond to the times at which it is desired to sample the data wave. Flip-flop 63 is driven by the ONE output of flip-flop 62. The ONE output of flip-flop 63 is at ground for the one-half-bit interval after each sampling pulse and the ZERO output is ground for the one-half-bit interval after each crossover pulse. Balancer 14 utilizes the relationships between time base pulses and the output voltages of flip-flop 63 to detect changes in the phase relationship between the time base signals and the data signals.

Balancer 14 cannot tell whether a data transition occurred at or before a time base crossover pulse; but when the sampler flip-flop 117 is triggered in coincidence with a time base sampling pulse, the balancer assumes that the data transition occurred after the crossover pulse and corrects accordingly. The long time constants of the integrators and the slow action of the thermistors may cause slight hunting in the resulting corrections, but the hunting produces only negligible jitter in the occurrence times of data transitions in the output of data flip-flop 26.

Balancer 14 includes four inputs AND gates 119, 120, 121, and 122. Ground ZERO output signals from time base flip-flop 63 are applied to enabling inputs of gates 119 and 122. The ground ONE outputs of the same flip-flop are applied to the enabling input connections of gates 120 and 121. Accordingly, gates 120 and 121 of balancer 14 are enabled by ground ONE signals from time base generating circuit 21 during the one-half-bit intervals immediately preceding each time base crossover pulse. This relationship is shown in FIGS. 8B and C. Similarly it can be seen that gates 119 and 122 are enabled by the ground ZERO time base signals during the one-half-bit intervals preceding each time base sampling pulse.

Data signals are applied from the output of sampler 19 by leads 114 and 118 to the actuating input connections of gates 119 through 122. A mark-to-space transition produces a negative-going signal at the ONE output of flip-flop 117 in sampler 19, and this negative-going signal tends to actuate gates 119 and 121 in the balancing circuit 14. Similarly, a space-to-mark transition produces a negative-going pulse on lead 118 which tends to actuate gates 120 and 122. Thus, a mark-to-space transition at a time base sampling pulse opens gate 119. In other words, the circuit time constants for the illustrated embodiment are such that the enabling influence of the ground ZERO output of flip-flop 63 persists long enough after the sampling pulse so that the data transition actuates gate 119. If the same type of data transition had occurred in response to a crossover pulse, the ground ONE output of flip-flop 63 would be the prevailing enabling signal and the data transition would actuate gate 121. Similarly, a space-to-mark transition opens gate 122 if it occurs at a sampling pulse, but it opens gate 120 if it occurs at a crossover pulse.

Output connections from gates 119 and 120 are coupled to the same input of a blocking oscillator 123, and the outputs of gates 121 and 122 are applied to a blocking oscillator 126. Output pulses from these blocking oscillators are applied to integrator circuits 127 and 128, respectively.

Each integrator includes a diode 129 for shunting positive-going signal transitions to ground. A coupling capacitor 124 and a diode 130 couple negative-going signal transitions to charge a capacitor 131 negatively with respect to ground. Charges imposed upon these capacitors may leak off by the flow of discharge current through steering diodes and thermistor bridge circuits which are connected between the integrator circuit outputs.

Assuming an ideal balanced condition as illustrated in FIG. 8, each of the sampler output data transitions occurs in response to a time base sampling pulse. The initial mark-to-space transition opens balancer gate 119 as previously described and actuates blocking oscillator 123. The following space-to-mark transition opens gate 122 and actuates blocking oscillator 126. As long as the line signal amplitudes remain essentially the same for the different data frequencies, there is no mark-space bias, the output of data detector 17 has approximately equal amplitude excursions for mark and space bits, and alternate data transitions in the output of sampler 19 occur at the time base sampling pulses. Consequently, the transitions actuate blocking oscillators 123 and 126 alternately so that approximately equal charges are impressed upon the capacitors 131 in the integrators 127 and 128. The output leads 132 and 133 from these integrators are thus at susbtantially the same potential with respect to ground, and no compensating signal is generated.

Two circuits are connected between output leads 132 and 133. One of these circuits includes a steering diode 136, a thermistor bridge circuit 137 and another diode 138. Diodes 136 and 138 are both poled for the forward conduction of electric current from lead 132 toward lead 133. The common terminal of two thermistors 137*a* and 137*b* in thermistor bridge 137 is connected to ground through capacitor 139. The common terminal of thermistors 137*c* and 137*d* is connected to the input terminal 74 of detector 17.

In a similar manner, another circuit including a steering diode 140, a thermistor bridge 141, and a diode 142 is also connected between output leads 132 and 133 of the integrators, and these two diodes are poled for forward conduction away from lead 133 and toward lead 132. The common terminal of thermistors 141*a* and 141*b* is connected to ground through a capacitor 143. The common terminal of thermistors 141*c* and 141*d* is connected to input terminal 75 of detector 17.

Now as long as output leads 132 and 133 of the two integrators are at substantially the same potential with respect to ground, their associated steering diodes 136, 138, 140, and 142 are all biased nonconducting and the input circuit of data detector 17 sees equal impedances to ground from terminals 74 and 75 through thermistor bridges 141 and 137 and their associated capacitors 143 and 139. Accordingly, the data detector operates in its normal manner and is not affected by the connections to its input circuit from balancer 14.

Assume now that the conditions of FIG. 9 should occur with the mark frequency signals yielding smaller amplitudes than do the space frequency signals. Mark frequencies produce only a relatively small potential difference across resonant circuit 77 as compared to the corresponding potential difference produced across resonant circuit 76 by space frequencies. Detector output lead 89 tends to change very little in potential while the potential with respect to ground at lead 88 swings over a relatively wide range. Therefore, the polarity reversal between the two leads 88 and 89 for the space-to-mark transition does not now take place until some time after the occurrence of the time base crossover pulse, and the effects of such crossover pulse have been dissipated by the time that the space-to-mark transition in FIG. 9A crosses the zero voltage axis. The next following time base pulse applied to sampler 19 from flip-flop 62 is a sampling pulse which activates the sampler to produce a data transition in the output circuit of sampler 19. This transition is illustrated in FIG. 9B and applies a negative-going pulse on lead 118 which opens gate 122. The output from gate 122 actuates blocking oscillator 126 to apply a pulse to integrator circuit 128. Thus, the data signal leading edge transition at the output of the sampler 19 was in phase with a sampling pulse the same as in the ideal condition.

The subsequent mark-to-space transition illustrated in FIG. 9A crosses the zero voltage axis at a time which is earlier than its normal crossing time under ideal conditions due to the illustrated bias. This time the crossover pulse actuates the sampler, and the trailing edge of the sampler output pulse occurs one-half of a bit interval before it would have occurred under the influence of ideal conditions. Thus, the mark-to-space transition applies a negative-going pulse on lead 114 which opens gate 121 to trigger blocking oscillator 126 once more. As long as the unbalanced conditions of FIG. 9 prevail, the data transitions in the output of sampler 19 cause blocking oscillator 126 to be repeatedly triggered while blocking oscillator 123 is never triggered. This condition permits the charge on capacitor 131 in integrator 127 to leak off while the charge on the capacitor in integrator 128 remains at a high negative level. Lead 132 becomes more positive than lead 133 thereby tending to bias steering diodes 136 and 138 for conduction to drive a current through these diodes and through thermistor bridge 137. The current flowing in bridge 137 reduces the resistances of the thermistors in that bridge and thereby reduces the impedance to ground from terminal 74 in data detector 17.

If the space frequency, instead of the mark frequency, should produce reduced amplitudes, the conditions illustrated in FIG. 10 prevail and cause blocking oscillator 123 to be repeatedly activated while blocking oscillator 126 is permitted to remain inactive. This reverses the conditions of the integrators 127 and 128 so that a negative charge is built up on the capacitor 131 of integrator 127 while the charge on the capacitor 131 of integrator 128 is decreased. Accordingly, lead 133 becomes more positive than lead 132 thereby causing current to flow in thermistor bridge 141 to reduce the potential difference across the resonant circuit 77 and thereby tend to reduce the unbalanced condition illustrated in FIG. 10.

It is obvious that any suitable alarm may be provided for actuation in response to the detection of a serious data bias condition. An attendant alerted thereby can initiate any necessary corrective maintenance procedures. However, in the meantime balancer 14 operates as described to reduce the bias and hold to a minimum the possibility of errors.

*Ready start detector*

The circuits of FIGS. 1 through 3 are arranged for demodulator operation in a data system utilizing a ready-start code including four bit intervals of ready frequency followed by four bit intervals of mark frequency, one bit interval of space frequency, and a final bit interval of mark frequency. Ready detector 18 in FIG. 3 is adapted to pick out of a train of data signals the four successive bits of ready frequency. In order to accomplish this it is provided with filter circuits for dividing data signals between the two detector paths in a manner similar to that previously described in connection with data detector 17. A resonant circuit 146 is tuned to the ready frequency so that ready frequency oscillations will be coupled to the amplifier 79' and the full wave rectifier 81'. Two resonant circuits 76' and 77' are tuned to the mark and space frequencies, respectively, and connected in series with resonant circuit 146 between the input terminals 148 and 149 of ready detector 18. The common terminal of resonant circuits 146 and 76' is connected to ground. Mark and space frequency oscillations activate one of the circuits 76' or 77' to develop potentials which are delivered to an amplifier 80' and a full wave rectifier 82'.

A balanced low-pass filter 83' receives the output signals from full wave rectifiers 81' and 82'. This filter is designed, however, to have an upper cutoff frequency which is approximately one-fourth of the cutoff frequency of filter 83, i.e., one-eighth of the data bit rate. Thus, the cutoff for low-pass filter 83' is lower than the cutoff for filter 83 by a factor *n*, which corresponds to the number of successive ready bit intervals which are to be detected. Filter 83' then produces an output on its leads 150 and 151 such that lead 150 is substantially more positive than lead 151 when the four ready bit intervals occur. This arrangement of filters has been found to work particularly well as an analog detector for successive oscillation bursts at a frequency which lies between two other nearby frequencies from which it is to be discriminated.

The output signals on leads 150 and 151 are applied to a ready sampler 20 in FIG. 2 which is similar to the data sampler 19 except that the time base signals received at sampler 20 from lead 23 are at a frequency which is equal to the bit rate of the data system rather than twice the bit rate. Synchronized ready signal transitions are applied on leads 154 and 155 from the output of ready sampler 20 to the input of the first stage in shift register 27. A lead 159 couples phase A timing signals from lead 23 to the shift input of register 27. This shift register cooperates with register 28 to provide temporary storage for data bits so that logic circuit 29 may detect the aforementioned ready-start code. Accordingly, register 27 must have a sufficient number of stages to retain the ready bits until the following six mark and space bits can be checked for the remaining mark-space portion of the ready-start code.

Low-pass filter 83' has a certain amount of delay which may be utilized to take up some of the required six-bit delay interval and thereby reduce the number of stages required in register 27. However, it has been found that the frequency of mark-space data transitions in data words preceding and following a ready-start code in the incoming line signals to the demodulator influences detected ready envelope configuration because each of the line frequency transitions between mark and space frequencies produces a certain amount of the intermediate ready frequency. The average value of ready frequency in a data work is, therefore, a function of the mark-space configuration of the word. The combination of the two factors, i.e., the long time constant of filter 83' with the variable difference between ready magnitude in the ready-start code and average ready magnitude of adjacent data words, may cause the four-bit ready part of the code to occupy time intervals in the output of sampler 20 that may vary in duration from three to six bits. Considering both the delay effects of filter 83' and the variable ready envelope duration, it was found to be convenient to use seven stages for ready register 27 and to arrange logic circuit 29 to detect the ready bits in any one of the permissible durations of three to six bits, inclusive.

Logic circuit 29 associated with ready register 27 is adapted to give an indication when the sequence of ready bit intervals is approximately centrally located in the register. For this purpose transistor-diode gates 152, 153, 156, and 157 are coupled to the ONE and ZERO outputs of the various shift register stages to provide enabling input signals to a main transistor-diode gate 158 when the ready bits are properly disposed in the shift register. The ONE output of stage 4 in the register is applied directly to an input of gate 158 so that this stage must certainly be set before a ready-start signal could be detected. The inverting outputs of the transistor-diode gates 152, 153, 156, and 157 are utilized; and, consequently, at least one ground disabling input must be applied to each of these gates in order that the gate may apply a corresponding positive enabling signal to the transistor-diode gate 158. Considering one of the possible combinations which could produce enabling input signals for gate 158 from ready register 27, a reset condition in stage ONE would disable gate 152 regardless of the condition of stage 6. A set condition in stage 2 tends to enable gate 153 and disable gate 157. A set condition in stage 3 disables gate 156. A set condition in stage 5 disables gate 153. Thus, if stage 1 is reset and stages 2 through 5 of the shift register are set, gates 152, 153, 156, and 157 are disabled and all inputs to gate 158 from register 27 are positive thereby indicating that the required sequence of ready bit intervals has been detected. Other combinations of set and reset stages in the register may also occur and cause gate 158 to be enabled.

Mark and space data signals from data sampler 19 are applied by leads 160 and 161 to the first stage input of the data shift register 28, and a lead 162 supplies phase B pulses to the shift input. Output leads from the ONE and ZERO outputs of these stages are arranged to provide positive enabling signals to gate 158 any time that a sequence of four marks is followed immediately by a space and then a mark. This is clearly indicated in FIG. 2 by the connections to gate 158 from the ONE outputs of stages 1 and 3 through 6, and from the ZERO output of stage 2. Now assuming that these mark and space bits were preceded by the necessary combination of ready bits, gate 158 is fully enabled and produces a positive output signal from its in-phase output lead. This positive signal is the start pulse which is used to initiate the operation of any utilization circuits. The start pulse lasts for only one bit interval because the shift registers are continuously operated, and the correct combination of mark and space bits exists in register 28 for only one bit interval before it is shifted out once more by time base pulses from the phase B timing output lead 24.

Although this invention has been described in connection with one particular embodiment thereof, it is to be understood that additional embodiments and modifications which would be obvious to those skilled in the art are included in the spirit and scope of the invention.

What is claimed is:

1. A demodulator for frequency-shift-modulated signals, said signals comprising information bits of predetermined discrete types, said demodulator comprising
means receiving said frequency-shift signals, frequency-sensitive impedance means connected to said receiving means for producing an output voltage envelope having voltage excursions of predetermined configurations for said discrete types of information bits,
means detecting distortion in said excursions, and
means responsive to the output of said detecting means changing the impedance of said frequency-sensitive impedance means to compensate for said distortion.

2. A frequency-shift demodulator for mark and space data signal bits occurring at a predetermined bit rate, said demodulator comprising
means receiving said frequency-shift data signals,
frequency-sensitive impedance means responsive to the different frequencies of said data signals producing output voltage excursions of different polarities with respect to a predetermined reference voltage level for the mark and space frequencies, respectively,
means detecting mark-space bias in said excursions and producing output voltages representative of detected bias, and
means responsive to said detector output voltages changing the input impedance of said frequency-sensitive means to compensate for said bias.

3. The demodulator in accordance with claim 2 in which
said bias detecting means is responsive to time bias in said signal excursions, and
said bias detecting means comprises means detecting changes in the phase of voltage transitions between said excursions.

4. A frequency-shift demodulator for mark and space data signal bits occurring at a predetermined bit rate, said demodulator comprising
means receiving said frequency-shift data signals,
frequency-sensitive impedance means responsive to the different frequencies of said data signals producing output voltage excursions of different polarities with respect to a predetermined reference voltage level for the mark and space frequencies, respectively, said impedance means comprising two parallel signal paths, bandpass impedance networks coupling the inputs of said paths to said receiving means and adapted to couple substantially only a different one of the mark or space frequencies to each of said paths, a balanced low-pass filter having its upper cut-off frequency selected so that frequencies above said bit rate are attenuated to a substantially insignificant level, and means coupling the outputs of said paths to the input of said low-pass filter for producing said data signal excursions,
means detecting mark-space bias in said excursions and producing output voltages representative of detected bias, and
means responsive to said detector output voltages changing the input impedance of said frequency-sensitive means to compensate for said bias.

5. In a demodulator for frequency-shift data signals occurring at a predetermined average bit rate and including different data bits represented by oscillations at different line frequencies,
frequency-sensitive means responsive to said signals for producing positive-going and negative-going signal excursions for said data bits, respectively,
a source of time base signals occurring at a frequency which is a function of said bit rate,
means comparing the phase of said time base signals with the phase of transitions between said signal excursions, said comparing means having two output connections arranged to have different relative polarities for leading and lagging phases, respectively, and
means coupling said output connections to said frequency-sensitive means for changing the characteristics thereof to offset phase discrepancies indicated by said comparing means.

6. The frequency-shift demodulator in accordance with claim 5 in which
said time base signals include two voltage pulse waves of opposite phase and at said bit rate, and said comparing means comprises
a first pair of coincidence gates connected to be enabled by the pulses of different ones of said time base waves and having their outputs connected together,
a second pair of coincidence gates connected to be enabled by the pulses of different ones of said time base waves and having their outputs connected together,
means coupling positive-going signal transitions between said excursions to one gate of each of said pairs of coincidence gates and coupling negative-going transitions to the other gate of each pair, and
means separately coupling the output of each of said pairs of gates to a different one of said comparing means output connections.

7. The demodulator in accordance with claim 6 in which each of said separate gate output coupling means comprises
a blocking oscillator producing a pulse in response to the operation of either one of the gates to which it is connected, and
an integrating circuit connecting the output of each blocking oscillator to one of said comparing means output connections.

8. The demodulator in accordance with claim 5 in which said coupling means comprises a current-sensitive variable resistance means responsive to the output of said phase comparing means and changing the input impedance characteristics of said frequency-sensitive means.

9. The demodulator in accordance with claim 8 in which said resistance means comprises
two thermistor bridges,
means connecting a first pair of diagonally opposite terminals of each of said bridges in a different series circuit between said phase comparing means output connections for conducting currents of different polarities, respectively, therebetween, and
means connecting a second pair of diagonally opposite terminals of each bridge in a different series circuit between ground and the input terminals of said frequency-sensitive means.

10. The demodulator in accordance with claim 9 in which said frequency-sensitive means comprises
two signal conduction paths,
band separation filter means coupling predetermined ones of said bit frequencies to said paths, respectively,
detecting means connected to said paths for producing said signal excursions, and
means connecting said series circuits for said second pair of diagonally opposite terminals of said thermistor bridges to the inputs of said paths, respectively.

11. In a demodulator for frequency-shift data signals including mark and space bits of predetermined bit interval duration, frequency-sensitive means responsive to said signals producing signal excursions of opposite polarity with respect to one another for said mark and space bits,
means connected to the output of said frequency-sensitive means for detecting in said excursions departures from said predetermined interval duration, and
means connecting the output of said detecting means to said frequency-sensitive means for offsetting said interval duration departures.

12. A synchronous demodulator for a frequency-shift data system, said demodulator comprising
a frequency detector receiving frequency-shift data signals and producing an output data wave with approximately equal positive and negative excursions with respect to a predetermined reference voltage level,
a source of time base signals,
a balanced amplifier having two input connections,
a steering gate responsive to the polarity of said excursions steering pulses from said source to one or the other said amplifier connections, and
a bistable trigger circuit connected to the output of said amplifier to be triggered in response to each polarity transition of said output data wave.

13. A demodulator for frequency-shift data systems, said demodulator comprising
a frequency detector producing an output data wave with positive and negative excursions with respect to a predetermined reference potential level for different types of data bits in received data signals,
a source of time base pulses,
a diode bridge, a first pair of diagonally opposite terminals of said bridge, all diodes of said bridge poled for forward conduction from one terminal of the pair to the other,
means applying said pulses to said first pair of terminals,
a second pair of diagonally opposite terminals in said bridge connected to receive said wave excursions,
a bistable trigger circuit, and
means coupling said second pair of terminals to the input of said trigger circuit for transferring such circuit from one of its stable conducting conditions to the other in response to a time base pulse following a wave transition between said excursions.

14. A demodulator for frequency-shift-modulated data signals and comprising
two signal conduction paths, means coupling two different frequencies of said signals to different ones of said paths,
a separate amplifier for each of said paths, each amplifier being adapted for maximum gain without limiting for anticipate signal amplitudes received from said coupling means,
means connected to the outputs of said amplifiers for producing signal excursions of opposite polarity for said two frequencies, respectively, and
balanced sampling means producing unmodulated data signals in response to polarity reversals between said excursions.

15. A demodulator comprising
a frequency detector responsive to frequency-shift data signals for producing output signal excursions of different polarity with respect to a predetermined reference voltage level for each of two different frequencies in said data signals,
means responsive to changes in the relative magnitudes of said excursions applying a magnitude correcting signal to the input of said frequency detector,
a source of time base signals, and
a balanced sampling circuit reproducing transitions between said excursions in synchronism with said time base signals.

16. A demodulator comprising
a frequency detector responsive to frequency-shift data signals for producing output signal excursions of different polarities with respect to a predetermined reference voltage level for each of two different input signal frequencies, and
means responsive to changes in the relative magnitudes of said excursions applying a magnitude correcting signal to the input of said detector.

17. A demodulator for frequency-shift data systems in which mark and space data bits are represented by signal portions of different frequencies and uniform predetermined durations, and in which a start signal precedes each group of data signals and includes a predetermined combination of mark and space bits together with $n$ successive bits intervals of an intermediate, ready, frequency between said mark and space frequencies, said demodulator comprising
a first frequency detector responsive to the mark and space frequencies for producing output signal excursions in different directions for said mark and space bits,
a second frequency detector receiving frequency-shift data signals and producing output signal excursions in one direction in response to either of said mark or space frequencies and excursions in the opposite direction in response to said intermediate, ready, frequency,
low-pass filter means connected to receive the output of said second frequency detecting means, said low-pass filter having an upper cutoff frequency corresponding to the data bit rate divided by $2n$,
storage means receiving outputs from said first frequency detector and from said low-pass filter, and
logic means producing an output pulse in response to the simultaneous presence in said storage means of the elements of said predetermined combination.

18. The demodulator in accordance with claim 17 in which said storage means comprises
a first shift register connected to the output of said low-pass filter,
a second shift register connected to the output of said first frequency detector, and means connecting outputs of said shift registers to said logic means.

19. In a demodulator for frequency-shift data systems wherein data bits occur at a predetermined bit rate, mark and space data bits are represented by equal duration bursts of oscillations at first and second frequencies, respectively, and ready bits are represented by a burst of oscillations at a third frequency which is between said first and second frequencies, a circuit in said demodulator for detecting the occurrence of $n$ successive one-bit bursts of said ready frequency oscillations, said detecting circuit comprising
a frequency detector receiving frequency-shift data signals, two output connections for said frequency detector, said frequency detector being adapted to produce at said connections signal excursions with a first polarity with respect to one another in response to the reception of said third frequency and with a second polarity in response to the reception of either one of said first or second frequencies,
a low-pass filter coupled to said output connections, said filter having its upper cutoff at a frequency with a period approximately equal to the duration of $2n$ data bits,
a shift register connected to receive the output of said low-pass filter, and
logic means detecting in said register at least a predetermined portion of the $n$ ready bits.

20. A demodulator for frequency-shift data systems wherein mark, space, and ready data bits are received as oscillation bursts of one bit interval duration and at first, second, and third frequencies, respectively, said demodulator comprising
a first frequency detector receiving frequency-shift data signals and producing on two output leads data bit pulses of one polarity for mark and a second polarity for space, a source of time base pulses, a balanced sampler receiving said time base pulses and said data bit pulses and producing output mark and space data pulses in synchronism with time base pulses, a signal balancer comparing pulses from said source with the output of said sampler and producing output signals which are a function of phase differences therebetween, means coupling said balancer output signals to the input of said first frequency detector, a second frequency detector receiving frequency-shift data signals and producing an output of predetermined polarity in response to *n* successive bit intervals of said third frequency, a first shift register receiving the output of said second frequency detector, a second shift register receiving the output of said balanced sampler, and logic means connected to said registers to be activated in response to the occurrence of a predetermined combination of bit intervals of said first, second, and third frequencies.

References Cited by the Examiner

UNITED STATES PATENTS

| | | | |
|---|---|---|---|
| 2,423,229 | 7/47 | Crosby | 325—320 |
| 2,424,961 | 8/47 | Bancroft et al. | 178—88 |
| 2,995,627 | 8/61 | Lakatos | 178—88 |

DAVID G. REDINBAUGH, *Primary Examiner.*